United States Patent [19]

Cheng

[11] Patent Number: 4,729,885

[45] Date of Patent: Mar. 8, 1988

[54] HIGH MIXING REACTOR PROCESS

[75] Inventor: Paul J. Cheng, Bartlesville, Okla.

[73] Assignee: Phillips Petroleum Co., Bartlesville, Okla.

[21] Appl. No.: 828,418

[22] Filed: Dec. 10, 1986

[51] Int. Cl.$^4$ .......................... C01B 31/02; C09C 1/48
[52] U.S. Cl. ...................... 423/450; 423/449; 423/455; 423/456; 423/457
[58] Field of Search ............. 423/449, 450, 455, 456, 423/457

[56] References Cited

U.S. PATENT DOCUMENTS

| | | | |
|---|---|---|---|
| 2,917,370 | 12/1959 | Edminster et al. | 23/209.4 |
| 3,100,689 | 8/1963 | Mason | 423/455 |
| 3,460,911 | 8/1969 | Krejci et al. | 23/259.5 |
| 3,477,816 | 11/1969 | Shepherd | 423/455 |
| 3,615,213 | 10/1971 | Shepherd | 423/450 |
| 3,619,141 | 11/1971 | Henderson et al. | 23/209.4 |
| 3,726,964 | 4/1973 | Krejci | 423/450 |
| 3,867,513 | 2/1975 | Krejci | 423/450 |
| 3,923,465 | 12/1975 | Krejci | 23/259.5 |
| 4,000,250 | 12/1976 | Cheng | 423/450 |
| 4,431,624 | 2/1984 | Casperson | 423/450 |

FOREIGN PATENT DOCUMENTS 855802 12/1960 United Kingdom ............... 423/450

*Primary Examiner*—Gregory A. Heller
*Attorney, Agent, or Firm*—A. W. Umphlett

[57] ABSTRACT

The moving of adjacent axial stream at sufficiently different speeds to create turbulence and rapid mixing of feedstock and hot gases in a carbon black reactor is utilized to provide a high surface area carbon black.

14 Claims, 1 Drawing Figure

HIGH MIXING REACTOR PROCESS

This is a related application to Ser. No. 674,906, filed Nov. 26, 1984, now abandoned.

BACKGROUND OF THE INVENTION

This invention relates to the production of carbon black. In one aspect, it relates to a process for producing high surface area carbon black. In particular, it relates to a method for the rapid mixing of feedstream and combustion stream in the production of high surface area carbon black.

A rapid mixing of feedstream and combustion stream is essential for the production of small particle carbon black. However, as carbon black reactor size increases the speed with which the feed and the combustion stream is mixed decreases, as long as the feed injection stream remains unchanged. This decrease of mixing speed is primarily due to the increase of eddy size with increasing reactor size, which in turn increases the mixing time. Consequently, when the reactor size increases there is a necessity for creating additional turbulence to decrease the mixing times.

By decreasing the mixing time an increase in the surface area of the carbon black product is achieved. Since carbon black price is based on the surface area of the carbon black and the amount of carbon black produced depends only on the rate of raw material input, it is important that high surface area carbon black can be produced in large amounts.

Therefore, an object of this invention is to produce high surface are carbon black. Another object of this invention is to create a high mixing speed in a large reactor. Another object of this invention is to decrease the eddy size and, therefore, create additional turbulence. Other objects of this invention will become apparent from the following description.

SUMMARY OF THE INVENTION

According to this invention there is provided a process for producing a high surface area carbon black in which fluids including at least one stream of carbon black feedstock and at least one stream of combustion gases are injected into a precombustion zone of a carbon black reactor so that one of the fluids is injected in axial flow through a first pipe nozzle concentric with the center line of the reactor and the remainder of the fluids are injected through the annuli formed by a plurality of pipe nozzles concentric with and surrounding the first pipe nozzle with the velocity of the fluid flow through the first pipe nozzle and the annuli controlled to provide radially adjacent axially flowing streams with each stream having a flow velocity that is sufficiently dissimilar from each adjacent stream to create turbulence and sufficiently rapid mixing of the streams to form high surface area carbon black on being subjected to combustion conditions.

In a preferred embodiment of the invention the flow velocity of each stream is controlled so that it is either greater than the flow velocity of each adjacent stream or less than the flow velocity of each adjacent stream. Determination of the patterns of velocities of flow can be made by setting the flow velocity from the first pipe nozzle either to be greater than the flow velocity from the adjacent annulus or less than the flow velocity from the adjacent annulus. Preferably, particularly when using the first pipe nozzle for inlet of feedstock to the precombustion zone, the flow velocity from the first pipe nozzle will be less than the flow velocity from the adjacent annulus.

In a still further embodiment of the invention at least one fluid is injected tangentially into the portion of the precombustion zone exterior to the outermost axially flowing stream with the tangentially flowing stream having an axial flow velocity component that is sufficiently different from the flow velocity of the outermost axially flowing stream to create turbulence. In the most preferred embodiment of the invention there will be flow through the first pipe nozzle, through three annuli, and through two radially oppositely paired tangential nozzles into the precombustion zone.

Similarly, apparatus is provided for introducing fluids into a precombustion chamber of a carbon black reactor. The apparatus is, in combination, a first pipe nozzle concentric with the center line of the carbon black reactor and arranged to discharge axial fluid flow into the precombustion zone and a plurality of pipe nozzles of successively greater diameter concentric with and surrounding the first pipe nozzle with the nozzles arranged to provide annuli between nozzles with discharge from the annuli of axially flowing fluid into the precombustion zone; and with means for controlling the flow of fluid from the first pipe nozzle and from the annuli to provide a stream of fluid from the first pipe nozzle and each annulus with each stream having a flow velocity that is sufficiently different from each adjacent stream to create turbulence and rapid mixing of the streams. Preferably controll means are provided so that each stream will have a flow velocity that is either greater than the flow velocity of each adjacent stream or less than the flow velocity of each adjacent stream.

In a further preferred embodiment apparatus is also provided so that there is at least one inlet for fluid to enter the precombustion zone tangentially in the portion of the precombustion chamber exterior to the outermost annulus. Most preferably two, radially opposite, tangential inlets are provided in an apparatus in which three annuli are also provided.

In an embodiment of the invention, the feed tube supplying feed stock and combustion gas to a carbon black reactor provides a first injection stream, surrounded in a radial direction by a first axial stream moving either faster or slower than the injection stream, with this first axial stream surrounded by a second axial stream moving either faster or slower than said first axial stream and with the second axial stream surrounded by a third axial stream and with the third axial stream surrounded by a tangential stream having an axial component such that the axial flow velocity of each stream differs from that of any adjacent stream. The first injection stream preferably moves slower than the first axial stream and the axial component of the tangential stream is also moving slower than the outermost fast moving stream. This creates a slower, faster, slower, faster and slower flow velocity pattern of adjacent axial streams in the critical mixing region of the carbon black reactor. The difference in velocity between adjacent streams creates a multitude of small eddies which produces a desirable rapid mixing effect.

This method could, of course, include a greater or lesser number of streams of varying velocity to create the effect desirable in the instant invention. In a preferred embodiment, the first injection stream is the feedstock oil to the reactor, although any stream can supply feedstock oil.

DETAILED DESCRIPTION OF THE DRAWING

Figure 1:
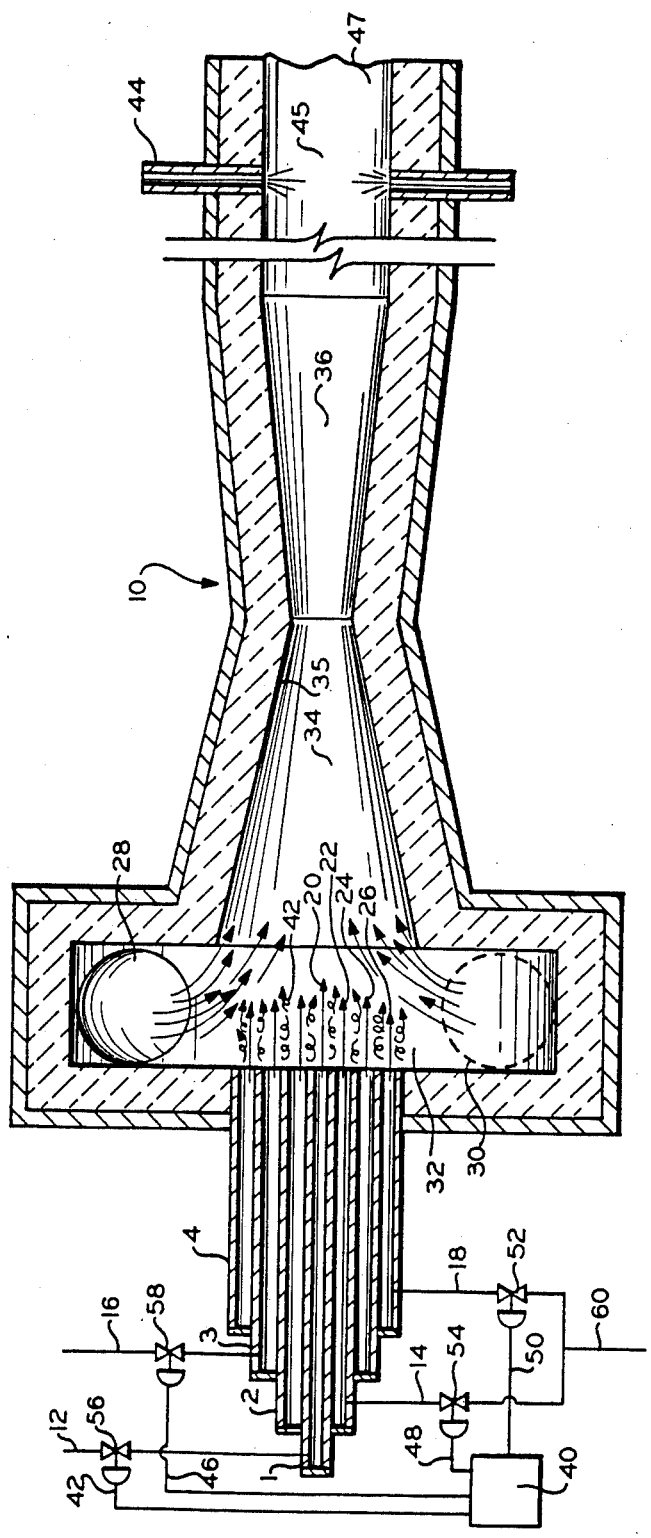

FIG. 1 is a cross section of a carbon black reactor illustrating one embodiment of the instant invention.

DETAILED DESCRIPTION OF THE INVENTION

Now referring to the drawings, in a preferred embodiment, a carbon black reactor 10 has a precombustion zone 32, a combustion zone 34, a reaction zone 36, a quench zone 45, and quench lines 44 for supplying quench fluid for stopping the reaction and opening 47 for discharging smoke to carbon black collection equipment not shown.

Hydrocarbon feedstock oil is provided at a slow velocity through line 12, valve 56, into pipe nozzle 1, and into the precombustion zone 32 of the reactor 10 to form first injection stream 20; air is provided at a relative fast velocity through line 14, valve 54, into the annulus between pipe nozzle 2 and pipe nozzle 1 to provide a first fast axial stream 22; air is provided through line 16 at a slow velocity through valve 58 and into the annulus between pipe nozzle 3 and pipe nozzle 2 to provide a slow axial stream 24; air is provided through line 18 and valve 52 at a fast velocity into the annulus between pipe nozzle 4 and pipe nozzle 3 to provide second fast axial fluid stream 26 in precombustion zone 32; the fast velocity air is supplied to lines 14 and 18 through line 60; control lines 42, 46, 48 and 50 provide control signals to valves 52, 54, 56 and 58 from flow controller 40 to obtain the required velocities; tangential opening 28 provides tangential air at slow velocity and tangential opening 30 which provides fuel gas at slow velocity. The slow tangential streams from nozzles 28 and 30 surround fast axial stream 26. The succession of streams surrounding first injection stream 20 discharging from pipe nozzle 1 creates a pattern of slower, faster, slower, faster, and slower streams that interface with each other and create small eddies 42 which cause a rapid mixing effect so that the total stream entering combustion zone 34 and venturi 35 of reactor 10 is thoroughly mixed before entering the reaction zone 36 to be used to produce carbon black of high surface area.

The fluids useful in the mixing streams can be chosen from those fluids that can be used in normal carbon black reactor processes. Some typical fluids include air, fuel, steam and inerts. Any combination of fluids can be used as long as feedstock oil, and sufficient fluids to support combustion, ie. air and fuel, are present.

As illustrated herein the feedstock tube is surrounded successively in a radial direction by flowing axial streams moving at axial speeds that are controlled so that each stream is either faster than any adjacent or slower than any adjacent stream. The range of velocity of the surrounding streams is generally broad and can be varied to suit the type of reactor, the conditions of the process or the size and distribution of carbon black particles desired.

According to this invention it is important not only to maintain a difference in velocity of adjacent streams to create a mixing effect, but also to maximize the mixing by maintaining a pattern of flow velocities in which each stream that has a stream adjacent on each side is moving at a flow velocity that is either slower than either of the adjacent streams or faster than either of the adjacent streams. The central—first injection—stream and most outward of the radially successive streams should also be controlled at a velocity to maintain an overall consistent pattern of flow velocities.

It must be specified that the critical aspect of this invention is to maintain a sufficient difference between the flow velocities of each radially successive stream to cause shear forces at the interfaces of the streams. A difference in the flow velocity of adjacent streams is most advantageously utilized in a process using at least four streams by using a pattern of flow in which a slower velocity stream has a stream of greater velocity situated both radially inward and radially outward in the pattern of flow and, similarly a faster velocity stream can be most advantageously used by being situated between streams of lesser velocity. The advantage as compared to a pattern in which a stream is bordered on one side by a stream of lesser velocity and on its other side by a stream of greater velocity is readily apparent as a matter of practical usage, particularly if the total number of streams used is four or more.

It is not necessary to control the flow velocity so that there is a single "faster" velocity and a single "slower" velocity with each assigned to a multiplicity of non-adjacent streams. The range of velocity for adjacent streams will depend on the surface area that is to be produced. Preferably a faster moving stream should have an axial velocity at least 100% greater than that of an adjacent slower moving stream. Velocities can vary from about 50 ft/sec to about 1700 ft/sec, preferably from about 100 ft/sec to about 1100 ft/sec, but the difference between the axial component of flow rates of adjacent streams must be within a range to create turbulence and sufficiently rapid mixing of the streams to form high surface area carbon black.

The following are the dimensions of a typical carbon black reactor useful in this process.

| Typical Apparatus | |
|---|---|
| Oil conduit (1), Diameter, inches, | 0.675 |
| Fluid conduit (2), diameters, inches, | |
| inside, | 0.87 |
| outside, | 1.0 |
| Fluid conduit (3), diameters, inches, | |
| inside, | 1.81 |
| outside, | 2.0 |
| Fluid conduit (4), diameters, inches, | |
| inside, | 2.2 |
| outside, | 2.5 |
| Precombustion Zone (32): | |
| Diameter, inches, | 30 |
| Length, inches, | 10 |
| Reactor (34), (Venturi): | |
| Diameter inlet, inches, | 20 |
| Converging half angle, degrees, | 20 |
| Tangential Entries (28) and (30): Diameter, inches | 10 |

The following is a calculated example showing the expected results and yields utilizing the process of this invention.

| INVENTION TYPICAL EXAMPLE (Calculated) | | |
|---|---|---|
| | With Invention | Without Invention |
| Total Tangential Air, SCF/HR., (@ 780° F.), | 188,500 | 210,500 |
| Total Tangential Gas, "$CH_4$", SCF/HR., | 11,700 | 11,700 |
| Oil Feed, Gallons/Hr., | 350 | 350 |

INVENTION TYPICAL EXAMPLE
(Calculated)

|  | With Invention | Without Invention |
|---|---|---|
| Temperature, °F., | 290 | 290 |
| API @ 60/60 °F., | −1.8 | −1.8 |
| BMCI, | 128 | 128 |
| Mid-Boiling Point, °F., | 798 | 798 |
| Oil Actual Exit Velocity, FT/SEC., | 80 | 80 |
| Air, SCF/HR., | 5,000 | 2,000* |
| Air, SCF/HR., | 4,000 | — |
| Air, SCF/HR., | 15,000 | — |
| Velocity, FT/SEC., (Fast) | 910 | 150 |
| Velocity, FT/SEC., (Slow) | 110 | — |
| Velocity, FT/SEC., (Fast) | 1,070 | — |
| Typical Yield |  |  |
| Pounds Carbon Black/Gallon Oil, | 4.52 | 4.52 |
| CTAB, m²/gm, (ASTM D3765-80), | 113 | 105 |

*For conventional jacket air cooling.

I claim:

1. A process for producing high surface area carbon black in which fluids comprising at least one stream of carbon black feedstock and at least one stream comprising combustion gases are injected into a precombustion zone of a carbon black reactor, said process comprising:
   (a) injecting one of said fluids in axial flow through a first pipe nozzle concentric with the center line of said reactor and the remainder of said fluids through the annuli formed by a plurality of pipe nozzles concentric with and surrounding said first pipe nozzle, and
   (b) controlling the velocity of fluid flow through said first pipe nozzle and said annuli to provide radially adjacent axially flowing streams with each stream having a flow velocity within a range of about 50 ft/sec to about 1700 ft/sec that is sufficiently dissimilar from each adjacent stream to create turbulence and sufficiently rapid mixing of the streams to form high surface area carbon black on being subjected to combustion conditions.

2. A process of claim 1 wherein each stream has a flow velocity that is either greater than the flow velocity of each adjacent stream or less than the flow velocity of each adjacent stream.

3. A process of claim 2 wherein the flow velocity from said first pipe nozzle is greater than the flow velocity from the adjacent annulus.

4. A process of claim 2 wherein the flow velocity from said first pipe nozzle is less than the flow velocity from the adjacent annulus.

5. A process of claim 2 wherein there are three annuli.

6. A process of claim 3 wherein there are three annuli.

7. A process of claim 4 wherein there are three annuli.

8. A process of claim 1 wherein at least one fluid is injected tangentially into the portion of the precombustion zone exterior to the outermost axially flowing stream said tangential flow having an axial flow velocity component that is sufficiently dissimilar from the flow velocity of said outermost axially flowing stream to create turbulence.

9. A process of claim 2 wherein at least one fluid is injected tangentially into the portion of the precombustion zone exterior to the outermost axially flowing stream said tangential flow having an axial flow velocity component that is sufficiently dissimilar from the flow velocity of said outermost axially flowing stream to create turbulence.

10. A process of claim 3 wherein at least one fluid is injected tangentially into the portion of the precombustion zone exterior to the outermost axially flowing stream said tangential flow having an axial flow velocity component that is sufficiently dissimilar from the flow velocity of said outermost axially flowing stream to create turbulence.

11. A process of claim 4 wherein at least one fluid is injected tangentially into the portion of the precombustion zone exterior to the outermost axially flowing stream said tangential flow having an axial flow velocity component that is sufficiently dissimilar from the flow velocity of said outermost axially flowing stream to create turbulence.

12. A process of claim 5 wherein at least one fluid is injected tangentially into the portion of the precombustion zone exterior to the outermost axially flowing stream said tangential flow having an axial flow velocity component that is sufficiently dissimilar from the flow velocity of said outermost axially flowing stream to create turbulence.

13. A process of claim 6 wherein at least one fluid is injected tangentially into the portion of the precombustion zone exterior to the outermost axially flowing stream said tangential flow having an axial flow velocity component that is sufficiently dissimilar from the flow velocity of said outermost axially flowing stream to create turbulence.

14. A process of claim 7 wherein at least one fluid is injected tangentially into the portion of the precombustion zone exterior to the outermost axially flowing stream said tangential flow having an axial flow velocity component that is sufficiently dissimilar from the flow velocity of said outermost axially flowing stream to create turbulence.

* * * * *